(12) United States Patent
Oliphant et al.

(10) Patent No.: US 8,286,248 B1
(45) Date of Patent: Oct. 9, 2012

(54) SYSTEM AND METHOD OF WEB APPLICATION DISCOVERY VIA CAPTURE AND ANALYSIS OF HTTP REQUESTS FOR EXTERNAL RESOURCES

(75) Inventors: Brett Oliphant, American Canyon, CA (US); Ben Tyler, Sacramento, CA (US); Gabriel Richard Pack, Napa, CA (US); Brett Hardin, American Canyon, CA (US)

(73) Assignee: McAfee, Inc., Santa Clara, CA (US)

( * ) Notice: Subject to any disclaimer, the term of this patent is extended or adjusted under 35 U.S.C. 154(b) by 951 days.

(21) Appl. No.: 12/024,972

(22) Filed: Feb. 1, 2008

Related U.S. Application Data

(60) Provisional application No. 60/887,801, filed on Feb. 1, 2007.

(51) Int. Cl.
*G06F 11/36* (2006.01)
(52) U.S. Cl. .......................................... 726/25; 726/22
(58) Field of Classification Search ..................... 726/25
See application file for complete search history.

(56) References Cited

U.S. PATENT DOCUMENTS

| | | | |
|---|---|---|---|
| 2003/0188194 A1* | 10/2003 | Currie et al. | 713/201 |
| 2003/0217144 A1* | 11/2003 | Fu et al. | 709/224 |
| 2005/0160286 A1* | 7/2005 | Currie et al. | 713/200 |
| 2006/0123477 A1* | 6/2006 | Raghavan et al. | 726/22 |
| 2006/0259767 A1* | 11/2006 | Mansz et al. | 713/168 |

OTHER PUBLICATIONS

File history for U.S. Appl. No. 10/113,875, entitled Method and Apparatus for Real-Time Security Verification of On-Line Services.
File history for U.S. Appl. No. 10/674,878, entitled Method and Apparatus for Real-Time Security Verification of On-Line Services.

* cited by examiner

*Primary Examiner* — Matthew Henning
(74) *Attorney, Agent, or Firm* — Wong, Cabello, Lutsch, Rutherford & Brucculeri LLP

(57) ABSTRACT

A method for discovering the structure, state transitions, and patterns of behavior of users of a web application includes a method for causing the web application to make HTTP requests for resources from an external supplier; capture of the requests for the external resources; extraction of meaningful data from the captured requests; and analysis to draw conclusions based on the extracted data. A system of invention provides a reference implementation of the method.

20 Claims, 3 Drawing Sheets

SYSTEM AND METHOD OF WEB APPLICATION DISCOVERY VIA CAPTURE AND ANALYSIS OF HTTP REQUESTS FOR EXTERNAL RESOURCES

CROSS REFERENCE TO RELATED APPLICATIONS

The present application claims priority from U.S. Provisional Patent Application No. 60/887,801 filed Feb. 1, 2007, the contents of which are herein incorporated by reference in their entirety.

FIELD OF THE INVENTION

The present invention relates to computer security and, more particularly, to discovering the topology of web applications, which can be used to create a more robust security scan of the application, thereby enhancing vulnerability detection and remediation.

BACKGROUND OF INVENTION

The popularity of the Internet has given rise to e-commerce. As illustrated in FIG. 1, many consumers 102 enjoy the convenience of shopping at home via websites 104 including internet portals (such as YAHOO), online shopping sites (such as AMAZON.COM), online auction sites (such as EBAY), and online banking sites (such as CITIBANK). Many other activities that formerly required live interactions either in person or via phone can be conducted on-line, such as applying for car or health insurance, buying and selling stocks, etc. via the Internet 106.

Such on-line activities typically require the exchange and storage of personal information such as credit card numbers and banking information. Accordingly, consumers want to be able to trust that the websites 104 are secure from on-line vulnerabilities, such as the ability for hackers to gain access to their personal information.

The inventions and technologies described in co-pending U.S. patent application Ser. Nos. 10/113,875 and 10/674,878, the contents of which are incorporated herein by reference in their entirety, have dramatically advanced the state of the art of vulnerability detection, assessment and management. For example, these co-pending applications describe techniques for performing vulnerability scans of websites, and hosting and controlling the contents of a mark in accordance with the scan results that indicates to visitors of the website how safe the website is. These vulnerability scans aim to duplicate and/or exploit methods known to be used by hackers to attempt to gain unauthorized access to the devices and systems of the website. Nevertheless, areas of potential improvement exist.

For example, the effectiveness of certain vulnerability scans is sometimes limited to entry points that are identified by conventional crawling methods. Meanwhile, certain parts of a website or web application can only be gained by users who are actually navigating the site, for example to make a purchase. It would be desirable to make use of the information from such actual use to enhance the knowledge of the site, and thus the effectiveness of vulnerability scans of the site.

SUMMARY OF THE INVENTION

The invention provides a system and method to discover the topology of web applications. According to one aspect, the invention leverages the pervasiveness of a security company's trust mark, which is made available to a certifiable web application, and has references thereto embedded in various parts of the web application. Control of the trust mark is maintained by the security company, and access to the mark is automatically requested by users' web browsers as they navigate the web application. These requests from users of the web application for the trust mark from the security company are logged and analyzed.

In embodiments, a method for discovering the structure, state transitions, and patterns of behavior of users of a web application according to the invention includes causing the web application to make HTTP requests for resources from an external supplier; capturing of the requests for the external resources; extracting meaningful data from the captured requests; and analyzing to draw conclusions based on the extracted data. A system of invention provides a reference implementation of the method. The information gained by the system and method can be used to infer valuable application entry points and patterns of traversal through the application that can be employed by the security company to further enhance the quality of their scanning service and the assurance their trust mark confers.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

Figure 1:
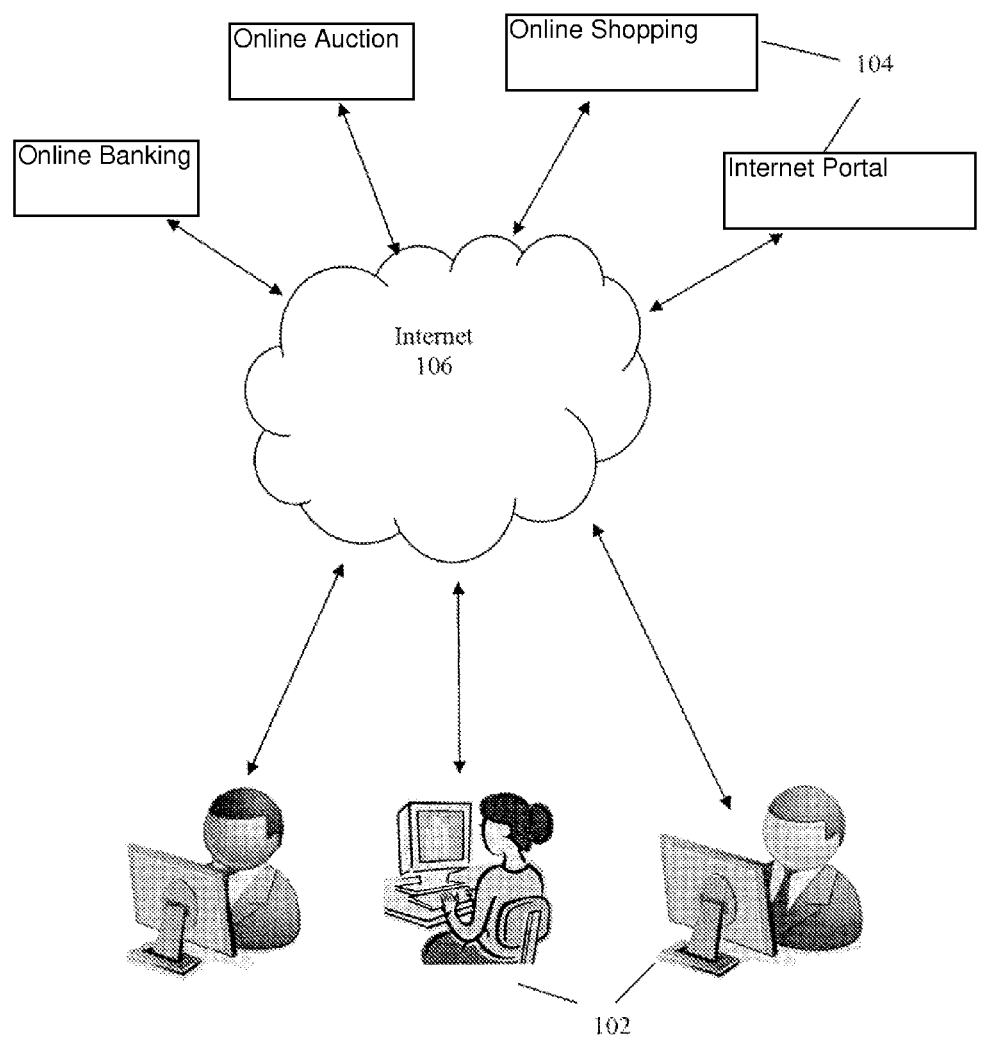
FIG. 1 illustrates how users interact with conventional websites.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described, or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the invention provides a system and method to discover the topology of web applications by leveraging the pervasiveness of a security company's trust mark. The security company provides access to a trust, mark from an HTTP server under control of the security company or under control of an authorized party acting on behalf of the security company. References to the trust mark for a specific web application are embedded in the content of the web application by its owners. HTTP requests for this trust mark by users accessing the web application are stored and analyzed by the security company, providing insight into the topology of the web application.

In embodiments, embedded references to the trust mark include Uniform Resource Locators (URLs) that can be used by a web browser to construct HTTP requests to retrieve the trust mark from the HTTP server of the security company. The present invention recognizes that an optional Referer header may be included in an HTTP request. The value of the Referer header specifies the URL of the resource containing the reference that caused the HTTP request to be issued. In practice, it is very uncommon for a web browser to not include an applicable Referer header. The present invention further recognizes that referer data, along with other auxiliary HTTP request information, can reveal the topology of a web application. This information is used to infer valuable application entry points and patterns of traversal through the application that can be employed by the security company to further enhance the quality of their scanning service and the assurance their trust mark confers.

Figure 2:
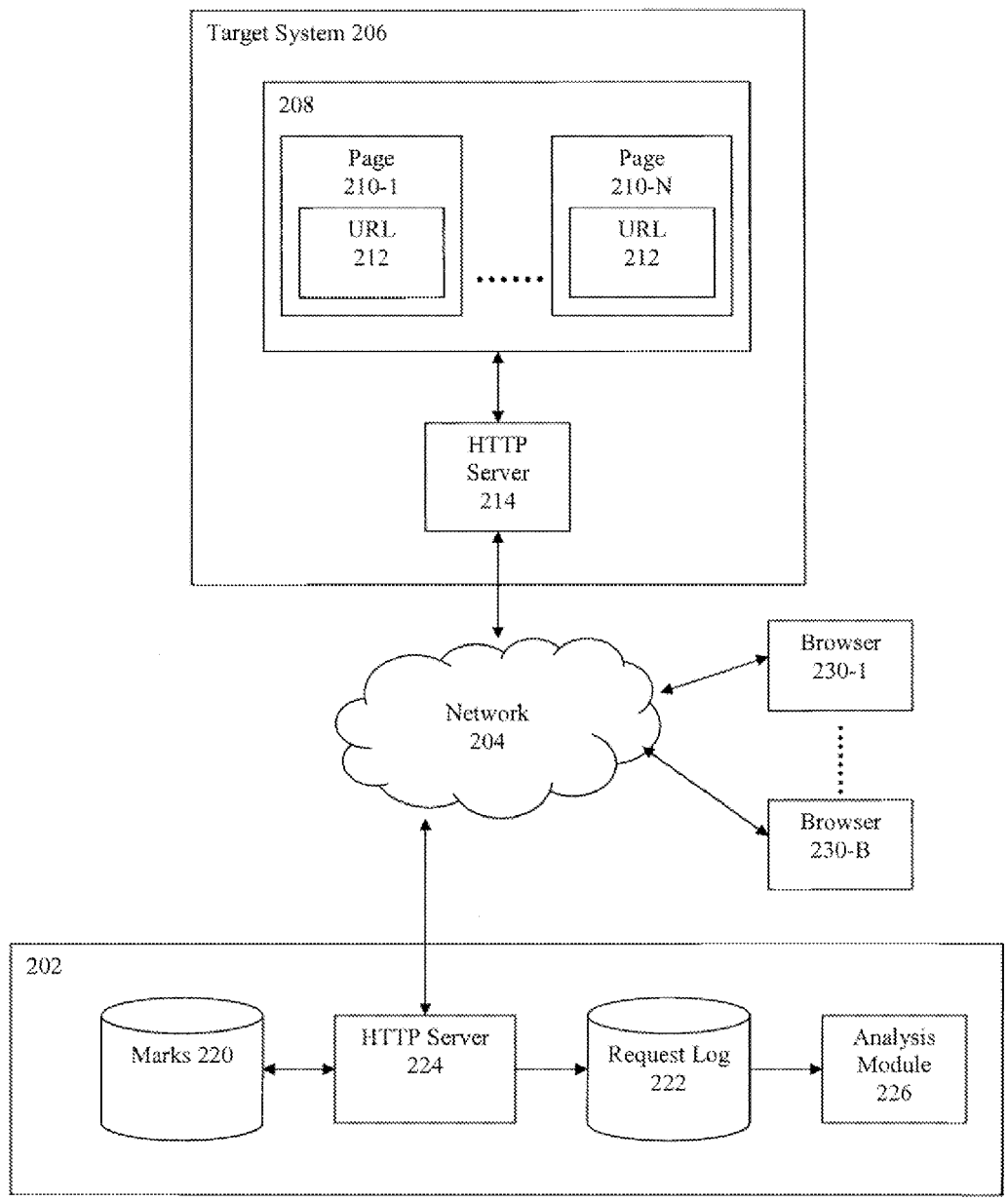
FIG. 2 is a block diagram illustrating an example system that implements aspects of target system analysis according to the invention.

An example system in accordance with certain aspects of the invention is illustrated in FIG. 2.

Security system 202 generates and hosts trust marks 220 for each web application it its purview. Preferably, as described in the co-pending applications for example, the mark is sufficiently complex and indicative of the point in time at which it is established, making the mark less amenable to illicit duplication by owners of web applications who would wish to offer the assurances of the mark without meeting its requirements. Security system 202 makes the trust marks available from an HTTP server 224 under its control or under control of an authorized party to act on behalf of the security company in the capacity of providing trust marks.

In embodiments, system 202 can be part of a network of distributed scanning servers, for example located in data centers that are geographically dispersed around the world. In embodiments, system 202 can include a local scan appliance that is controlled by a central vulnerability management system, so that the most suitable scan appliance is assigned to test the target system. Additionally or alternatively, the remote file inclusion vulnerability detection techniques of the invention can be implemented by detection system 202 in addition to a more comprehensive set of vulnerability detection methods against target systems, such as those provided by conventional scanning services such as ScanAlert of Napa. Calif., and those described in the co-pending applications.

Target system 206 includes one or more web applications 208, which can control fixed or dynamically generated web content, including pages 210. As shown, certain or all of these pages 210 can include references (e.g. URL 212) to one or more trust marks hosted by system 202 and stored in store 220.

Users of a web application interact with the application 208 via web browsers 230 and Internet 204. When a browser 230 renders content from an application such as pages 210, it encounters the embedded URL 212 and automatically makes an HTTP request from system 202 for the mark based on the embedded URL 212. It should be apparent that the content of the pages 210 can also reference other resources through additional URLs. When browser 230 encounters such additional URLs for other resources, it makes HTTP requests for those resources as well.

According to aspects of the invention, included in the request from browsers 230 for a corresponding mark in store 220 is the URL associated with the page 210, informing the HTTP server 224 about where the application 208 is referencing the mark. As the trust mark is treated as an additional referenced resource, requests from browser 230 for the trust mark include the Referer header, revealing the URL of the content or page 210 that includes the reference (e.g. URL 212) to the trust mark.

HTTP server 224 records the HTTP requests for the trust marks from store 220 in store 222. Various approaches can be taken for recording the requests. For example, standard logging facilities present in conventional market-leading HTTP servers such as Apache can be used to generate request logs. The logs supply the data for analysis of the application's topology by analysis module 226 as will be explained in more detail below.

Additionally or alternatively, system 202 can include a web or other type of application that monitors and maintains trust mark requests in a relational database or similar storage mechanism. This can allow capturing of HTTP requests to be much more transient, providing realtime feedback for immediate analysis and application by a scanning service, bypassing the need for intermediary storage and offline analysis.

An example method that can be implemented by analysis module 226 will now be explained in connection with the flowchart of FIG. 3.

Figure 3:
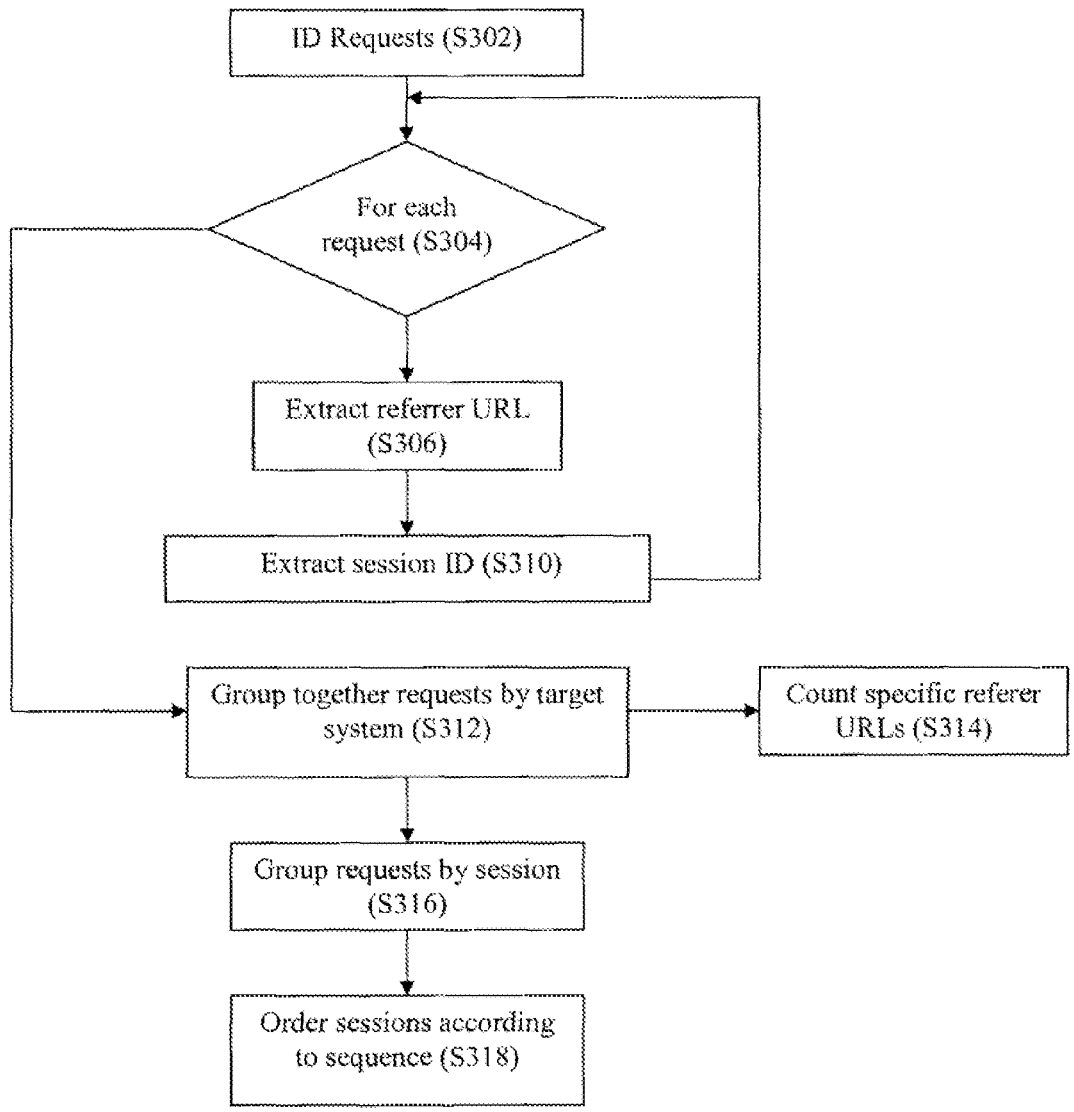
FIG. 3 is a flowchart illustrating an example target system analysis method of the invention.

As shown in FIG. 3, the process starts in steps S302, where captured requests are inspected in relative order, and are parsed according to the HTTP protocol. For each request (determined in step S304), HTTP request headers are extracted (step S306). The headers are effectively a list of 2-tuples. The first element of a given tuple specifies a header name. The second element of a given tuple specifies a header value. Tuples with a header name of Referer are extracted in step S306, and more particularly the header value element. This value is the URL associated with the content from web application 208 (e.g. page 210) that was responsible for directing the web browser 230 or other HTTP client to request the trust mark 220.

Accordingly, the referer URL extracted in step S306 is a reference to content controlled by web application 208. Security scans require configured entry points to initiate traversal and vulnerability detection for a web application. According to aspects of the invention, the referer URLs provide very valuable input for a security scan. For example, specific cases of value include a Referer URL that references part of the web application 208 that would not have otherwise been traversed by the security scan based on other configured entry points. The referer URL may also allow the security scanner to traverse part of a web application much sooner than it would have otherwise, potentially enhancing the efficiency of the scan.

The frequency of a given referer URL provides a relative indication of the popularity of the associated content. This information can also be very valuable for a security scan. The present invention recognizes that certain classes of security exploits rely on intercepting traffic through a web application and modifying the application's content, often causing a user's web browser to execute arbitrary malicious code. Increased traffic naturally leads to an increased probability of interception, and a knowledge of the most frequently accessed content allows a security scan to intelligently prioritize which portions of a web application receive the most thorough and timely scrutiny.

Accordingly, as shown in FIG. 3, after all requests have been inspected, a next step S310 includes grouping all referer URL's for a given target system together, and providing a count for each specific referer URL in step S312.

To augment the value of the Referer data, in embodiments of the invention, the HTTP server 224 employs HTTP sessions. HTTP is a stateless protocol and does not provide an inherent mechanism for tracking sessions. Rather, some sort of session state must be passed with each HTTP request. Cookies provide a convenient mechanism for this by allowing session identifiers to be placed in HTTP request headers and by also allowing HTTP responses to contain directives in response headers to synchronize session state from an HTTP server to an HTTP client. Using HTTP cookies, a trust mark server 224 establishes a unique identity for each HTTP client (e.g. browser 230) that requests a trust mark from system 202.

Accordingly, in embodiments of the invention as shown in FIG. 3, session identifiers are also extracted from captured HTTP requests in step S308, along with information regarding the sequence of the request in the session. Then, in step S316, requests associated with a specific target system are further organized by sessions using session identifiers. Next, the requests in the sessions are ordered in the sequence in which they were made in step S318.

According to aspects of the invention, the order of requests in the session reveals a partial view of the traversal of the site by the associated HTTP client (e.g. browser 230). Taken at large, the session traversals indicate general traffic patterns through the web application. Advancing knowledge of the web application beyond simply increasing awareness of resources under the application's control, using session identifiers, a security scan understands the order in which resources are accessed.

Moreover, to help more thoroughly traverse a web application, the session information provided by the invention allows a security scanner to discover the business processes implied by the structure of the content of the web application. A common example is a shopping cart where users must traverse a series of steps in the process of searching for, selecting, and paying for goods purchased online. Each step adds some sort of accumulated state to the user's session, and successive steps cannot be entered into without the presence of the requisite state. Using the knowledge of the order of access of resources, a security scan increases the probability of successfully traversing the content of a business process. Such knowledge allows the scan to request a sequence of resources that is consistent with the order discovered through analysis of session Referer URLs.

Knowledge of the order of traversal of resources in a web application provided by the invention can also be used to enhance a security scan's choice of resource requests in yet another way. The frequency of a URL as a basis for inspection can be augmented with an understanding of the structure of the content of the web application. Analyzing the traversals as directed graphs, resources that correspond to critical nodes can be identified. Critical nodes are those with the most connections to other nodes in the graphs. Effectively, these nodes represent common waypoints or gateways to and from significant structural portions of the web application's content. Similar to the benefits gained by counting and identifying Referer URLs of high relative frequency, critical nodes are also important resources requiring enhanced attention from a security scan.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A web application topology discovery method comprising:
    providing access to a trust mark from a server not under control of an owner of a web application, wherein references to the trust mark are embedded in content of the web application by the owner of the web application;
    receiving at the server one or more requests for the trust mark from one or more users of the web application, the requests being generated by the users' web browsers upon encountering the embedded references to the trust mark in the content of the web application; and
    inspecting the received requests to obtain information about the web application to be used as an input for a security scan.

2. The method of claim 1 wherein references to the trust mark embedded in the content of the web application include uniform resource locators (URLs) that can be used by a web browser to construct requests to retrieve the trust mark from the server and wherein each constructed request includes a referrer header containing the URL and auxiliary request information.

3. The method of claim 1 further comprising recording the received requests by maintaining the trust mark requests in a relational database.

4. The method of claim 1 wherein inspecting the received requests comprises parsing the request according to the HTTP protocol.

5. The method of claim 1 wherein inspecting the received requests to identify a part of the web application to serve as an input for a security scan comprises determining a frequency of a given location within the application where the application is referencing the trust mark, such that more frequently accessed content may be prioritized in the security scan.

6. The method of claim 1 wherein inspecting the received requests to identify a part of the web application to serve as an input for a security scan comprises:
    extracting session identifiers from the received requests;
    grouping the requests according to their session;
    extracting information regarding a sequence of a received request within a session;
    ordering the requests in the sequence in which they were made; and
    determining from such session and sequence information a traffic pattern through the web application.

7. The method of claim 6 wherein determining a traffic pattern through the web application comprises determining a business process associated with the web application.

8. The method of claim 1 wherein inspecting the received requests to identify a part of the web application to serve as an input for a security scan comprises:
    determining a frequency of a given location within the application where the application is referencing the trust mark;
    extracting session and sequence information from the received requests and determining a traffic pattern through the web application from such session and sequence information;

combining the frequency and traffic pattern to identify one or more critical nodes for prioritization in the security scan.

9. A system for discovering topology of a web application, the system comprising:
   a store containing one or more trust marks;
   a server adapted to provide access to the one or more trust marks upon receiving requests from a user of the web application, each request being generated upon a user's encountering a reference to the trust mark embedded in the content of the web application by an owner of the web application;
   a request log adapted to store the received requests; and
   an analysis module adapted to inspect the received requests to obtain information about the web application to be used as an input for a security scan;
   wherein the system is not under control of an owner of the web application.

10. The system of claim 9 wherein the system is part of a network of distributed scanning servers.

11. The system of claim 9 wherein the system further comprises a local scan appliance controlled by a central vulnerability management system.

12. The system of claim 9 wherein the reference to the trust mark embedded in the content of the web application includes a uniform resource locator (URL) and wherein each request includes a referrer header containing the URL and auxiliary request information.

13. The system of claim 9 wherein the server is an HTTP server.

14. The system of claim 9 wherein the request log adapted to store the received requests comprises a relational database.

15. The system of claim 9 wherein the analysis module is adapted to inspect the received requests to obtain information about the web application to be used as an input for a security scan by determining a frequency of a given location within the application where the application is referencing the trust mark, such that more frequently accessed content may be prioritized in the security scan.

16. The system of claim 9 wherein the analysis module is adapted to inspect the received requests to obtain information about the web application to be used as an input for a security scan by:
   extracting session identifiers from the received requests;
   grouping the requests according to their session;
   extracting information regarding a sequence of a received request within a session;
   ordering the requests in the sequence in which they were made; and
   determining from such session and sequence information a traffic pattern through the web application.

17. The system of claim 16 wherein the analysis module is further adapted to determine a business process associated with the web application.

18. The system of claim 9 wherein the analysis module is adapted to inspect the received requests to obtain information about the web application to be used as an input for a security scan by:
   determining a frequency of a given location within the application where the application is referencing the trust mark;
   extracting session and sequence information from the received requests and determining a traffic pattern through the web application from such session and sequence information;
   combining the frequency and traffic pattern to identify one or more critical nodes for prioritization in the security scan.

19. A web application topology discovery method comprising:
   providing access to a trust mark from a server not under control of an owner of a web application, wherein references to the trust mark, each reference including a uniform resource locator (URL), are embedded in content of the web application by the owner of the web application;
   receiving at the server one or more requests for the trust mark from one or more users of the web application, the requests being generated by the users' web browsers upon encountering the embedded references to the trust mark in the content of the web application, wherein each constructed request includes a referrer header containing the URL; and
   inspecting the received requests to obtain information about the web application to be used as an input for a security scan.

20. The method of claim 19 wherein inspecting the received requests to identify a part of the web application to serve as an input for a security scan comprises:
   determining a frequency of a given location within the application where the application is referencing the trust mark;
   extracting session and sequence information from the received requests and determining a traffic pattern through the web application from such session and sequence information;
   combining the frequency and traffic pattern to identify one or more critical nodes for prioritization in the security scan.

* * * * *